United States Patent
Lee et al.

(10) Patent No.: US 10,566,637 B2
(45) Date of Patent: Feb. 18, 2020

(54) HYDROGEN CONCENTRATION ESTIMATING METHOD AND SYSTEM FOR FUEL CELL

(71) Applicants: Hyundai Motor Company, Seoul (KR); Kia Motors Corporation, Seoul (KR)

(72) Inventors: Joon Yong Lee, Seoul (KR); Soon Woo Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/004,483

(22) Filed: Jun. 11, 2018

(65) Prior Publication Data

US 2019/0181473 A1   Jun. 13, 2019

(30) Foreign Application Priority Data

Dec. 12, 2017   (KR) .......................... 10-2017-0170811

(51) Int. Cl.
  *H01M 8/04*       (2016.01)
  *H01M 8/0444*     (2016.01)
  *H01M 8/04223*    (2016.01)
  *H01M 8/0438*     (2016.01)
  *H01M 8/04746*    (2016.01)
  *H01M 8/04791*    (2016.01)

(52) U.S. Cl.
  CPC ... *H01M 8/04447* (2013.01); *H01M 8/04231* (2013.01); *H01M 8/04388* (2013.01); *H01M 8/04395* (2013.01); *H01M 8/04753* (2013.01); *H01M 8/04798* (2013.01)

(58) Field of Classification Search
  CPC ....................................................... H01M 8/00
  See application file for complete search history.

(56) References Cited

FOREIGN PATENT DOCUMENTS

| JP | 2006-079891 | * | 3/2006 |
| JP | 2006079891 A | | 3/2006 |
| KR | 10-1459815 B1 | | 11/2014 |

* cited by examiner

*Primary Examiner* — Jacob B Marks
(74) *Attorney, Agent, or Firm* — Mintz Levin Cohn Ferris Glovsky and Popeo, P.C.; Peter F. Corless

(57) ABSTRACT

A hydrogen concentration estimating method for a fuel cell includes: measuring a flow rate of air supplied to a fuel cell stack, and comparing the measured flow rate of the air with a predetermined flow rate; determining a model of an air processing system according to a comparison result; and estimating hydrogen concentration of a fuel processing system based on the determined model of the air processing system.

17 Claims, 4 Drawing Sheets ically, to a hydrogen concentration estimating method and system in which hydrogen concentration is estimated by variably setting a model according to an air supply amount of a fuel cell stack.

HYDROGEN CONCENTRATION ESTIMATING METHOD AND SYSTEM FOR FUEL CELL

CROSS REFERENCE TO RELATED APPLICATION

The present application claims under 35 U.S.C. § 119(a) the benefit of Korean Patent Application No. 10-2017-0170811, filed on Dec. 12, 2017, the entire contents of which are incorporated by reference herein.

BACKGROUND

(a) Technical Field

The present disclosure relates generally to a hydrogen concentration estimating method and system for a fuel cell, more particularly, to a hydrogen concentration estimating method and system in which hydrogen concentration is estimated by variably setting a model according to an air supply amount of a fuel cell stack.

(b) Description of the Related Art

As is well known in the art, a fuel cell is a device that converts chemical energy of a fuel into electrical energy though an oxidation-reduction reaction of hydrogen and oxygen supplied from a hydrogen supply device and an air supply device, respectively, and includes a fuel cell stack for producing electricity, a cooling system for cooling the fuel cell stack, etc.

In other words, hydrogen is supplied to an anode of the fuel cell stack, and an oxidation reaction in which hydrogen is oxidized occurs at the anode to generate hydrogen ions (protons) and electrons. At this time, the protons and electrons generated at the anode flow to a cathode though an electrolyte membrane and a separator plate, respectively. At the cathode, water is generated through an electrochemical reaction involving the protons and the electrons having flowed from the anode, and oxygen contained in the air, and this flow of electrons generates electricity.

Hydrogen supplied to the anode of the fuel cell stack must be maintained at an appropriate concentration level, so that appropriate hydrogen purging control is performed in a hydrogen recirculation line. In general, the hydrogen purging control is performed by estimating the hydrogen concentration in real time, thereby maintaining an appropriate hydrogen concentration level.

However, when the hydrogen concentration is estimated in real time in a fuel cell stop mode, a problem arises that there is a large error between a hydrogen concentration estimate and a hydrogen concentration measurement in a fuel processing system.

FIG. 1 (RELATED ART) is a graph showing a hydrogen concentration measurement and a hydrogen concentration estimate as a function of fuel cell current according to the related art.

Referring to FIG. 1, in a fuel cell stop mode (FC Stop Mode) in which the fuel cell current (output current of the fuel cell stack) is zero, an error between the hydrogen concentration measurement and the hydrogen concentration estimate is large.

Specifically, in the fuel cell stop mode, the hydrogen concentration measurement increases as the fuel cell stop mode continues. However, the hydrogen concentration measurement in the fuel cell stop mode is unreliable in that the hydrogen concentration does not increase.

The hydrogen concentration estimate decreased as the fuel cell stop mode continued, and even the hydrogen concentration decreased to about 20 to 30%. However, according to experiments, the actual hydrogen concentration measurement was maintained at a hydrogen concentration of about 60%.

In other words, as a large error occurs between the hydrogen concentration measurement and the hydrogen concentration estimate in the fuel cell stop mode, the estimate is significantly reduced unlike the actual hydrogen concentration, which causes a problem of performing excessive hydrogen purging at the time of releasing the fuel cell stop mode. The performing of excessive hydrogen purging is disadvantageous in improving fuel mileage and meeting emission standards.

The foregoing is intended merely to aid in the understanding of the background of the present disclosure, and is not intended to mean that the present disclosure falls within the purview of the related art that is already known to those skilled in the art.

SUMMARY

The present disclosure provides a hydrogen concentration estimating method and system for a fuel cell, in which hydrogen concentration in a fuel processing system is accurately estimated even in a fuel cell stop mode.

In order to achieve the above object, according to one aspect of the present disclosure, there is provided a hydrogen concentration estimating method for a fuel cell, the method including: measuring a flow rate of air supplied to a fuel cell stack, and comparing the measured flow rate of the air with a predetermined flow rate; determining a model of an air processing system according to a comparison result; and estimating hydrogen concentration of a fuel processing system based on the determined model of the air processing system.

In the comparing the measured flow rate of the air with the predetermined flow rate, the predetermined flow rate may be set by a flow rate of air that occurs when air supply to the fuel cell stack is shut off.

In the determining the model of the air processing system, when the measured flow rate of the air exceeds the predetermined flow rate, the air processing system may be determined to be an open model.

When the air processing system is determined to be the open model, when estimating the hydrogen concentration of the fuel processing system, hydrogen partial pressure of the air processing system may be zero.

When the air processing system is determined to be the open model, when estimating the hydrogen concentration of the fuel processing system, nitrogen partial pressure or oxygen partial pressure of the air processing system may be obtained based on gas pressure and water vapor partial pressure of the air processing system.

In the determining the model of the air processing system, when the measured flow rate of the air is equal to or less than the predetermined flow rate, the air processing system may be determined to be a closed model.

When the air processing system is determined to be the closed model, when estimating the hydrogen concentration of the fuel processing system, hydrogen partial pressure of the air processing system is increased by hydrogen that crosses over from the fuel processing system.

When estimating the hydrogen concentration, the hydrogen partial pressure of the air processing system may be obtained using the following equations:

$$n_{H_2} = n_{H_2\_init} + \int \dot{n}_{H_2} dt$$

$$P_{H_2} = n_{H_2} \frac{RT}{V_{Ca}}$$

$n_{H_2}$: the number of moles of hydrogen in the air processing system, $n_{H_2\_init}$: the initial number of moles of hydrogen in the air processing system, $\dot{n}_{H_2}$: the number of moles of crossed-over hydrogen per unit time, $P_{H_2}$: the hydrogen partial pressure of the air processing system, R: the gas constant, T: the gas temperature, $V_{Ca}$: the volume in the air processing system.

When the air processing system is determined to be the closed model, when estimating the hydrogen concentration of the fuel processing system, oxygen partial pressure of the air processing system is decreased by oxygen that crosses over to the fuel processing system.

When estimating the hydrogen concentration, the oxygen partial pressure of the air processing system may be obtained using the following equation:

$$P_{O_2} = P_{O_2\_init} \exp\left(-\frac{t}{T_1}\right)$$

$P_{O_2}$: the oxygen partial pressure of the air processing system, $P_{O_2\_init}$: the initial oxygen partial pressure of the air processing system, t: the duration time of the closed model of the air processing system, T1: the time constant (constant).

When the air processing system is determined to be the closed model, when estimating the hydrogen concentration of the fuel processing system, nitrogen partial pressure of the air processing system is decreased by nitrogen that crosses over to the fuel processing system.

When estimating the hydrogen concentration, the nitrogen partial pressure of the air processing system may be obtained using the following equations:

$$P_{N_2} = n_{N_2} \frac{RT}{V_{Ca}}$$

$$n_{N_2} = n_{Ca} - n_{H_2} - n_{O_2}, \quad n_{Ca} = \frac{P_{Ca} V_{Ca}}{RT}$$

$P_{N_2}$: the nitrogen partial pressure of the air processing system, $n_{N_2}$: the number of mole of nitrogen in the air processing system, $V_{Ca}$: the volume in the air processing system, R: gas constant, T: the gas temperature, $n_{Ca}$: the number of moles of gas in the air processing system, $n_{H_2}$: the number of moles of hydrogen in the air processing system, $n_{O_2}$: the number of moles of oxygen in the air processing system, $P_{Ca}$: the gas pressure in the air processing system.

When estimating the hydrogen concentration of the fuel processing system, water vapor partial pressure of the air processing system or the fuel processing system may be saturated water vapor pressure.

When estimating the hydrogen concentration of the fuel processing system, nitrogen partial pressure of the fuel processing system is increased by nitrogen that crosses over from the air processing system.

When estimating the hydrogen concentration of the fuel processing system, hydrogen partial pressure of the fuel processing system is obtained by subtracting nitrogen partial pressure and water vapor partial pressure from gas pressure of the fuel processing system.

When estimating the hydrogen concentration of the fuel processing system, hydrogen partial pressure of the fuel processing system may be estimated by dividing hydrogen partial pressure of the fuel processing system by the sum of nitrogen partial pressure and the hydrogen partial pressure.

After the estimating the hydrogen concentration of the fuel processing system, the fuel processing system may be controlled such that the estimated hydrogen concentration of the fuel processing system follows a target hydrogen concentration.

According to another aspect of the present disclosure, there is provided a hydrogen concentration estimating system for a fuel cell, the system including: an air processing system supplying air to a fuel cell stack; a fuel processing system supplying hydrogen to the fuel cell stack; and a hydrogen concentration estimator measuring a flow rate of the air supplied to the fuel cell stack from the air processing system, comparing the measured flow rate of the air with a predetermined flow rate, determining a model of the air processing system, and estimating hydrogen concentration of the fuel processing system based on the determined model of the air processing system.

The hydrogen concentration estimator may determine the air processing system to be an open model when the measured flow rate of the air exceeds the predetermined flow rate, and may determine the air processing system to be a closed model when the measured flow rate of the air is equal to or less than the predetermined flow rate.

The system may further include: a pressure controller controlling pressure of the hydrogen supplied from the fuel storage system to the fuel processing system; a purge controller controlling opening and closing of a purge valve; and a host controller controlling the pressure controller and the purge controller such that the hydrogen concentration of the fuel processing system estimated by the hydrogen concentration estimator follows a target hydrogen concentration.

According to the hydrogen concentration estimating method and system according to the present disclosure, accuracy of the hydrogen concentration estimator can be improved even in a fuel cell stop mode.

Further, when the fuel cell stop mode is released, excessive hydrogen purging or excessive pressure control can be prevented.

In addition, the amount of hydrogen that is unnecessarily consumed to increase the hydrogen concentration in the fuel processing system can be reduced, which is advantageous in improving fuel mileage and meeting emission standards.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Figure 1:
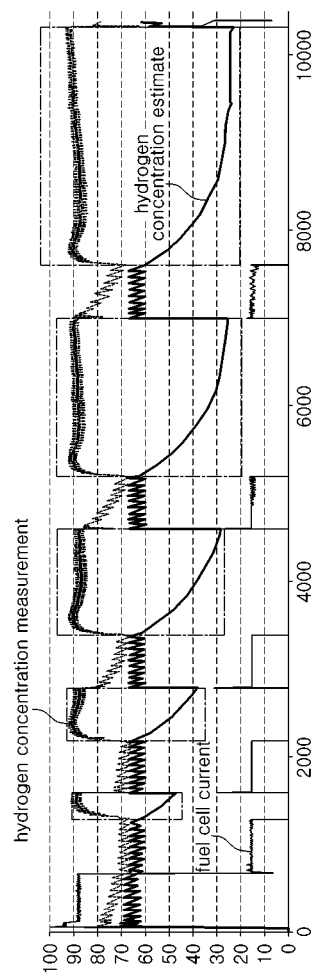
FIG. 1 (RELATED ART) is a graph showing a hydrogen concentration measurement and a hydrogen concentration estimate as a function of fuel cell current according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure are disclosed only for illustrative purposes and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

Hereinbelow, exemplary embodiments of the present disclosure will be described in detail with reference to the accompanying drawings. Throughout the drawings, the same reference numerals will refer to the same or like parts.

Figure 2:
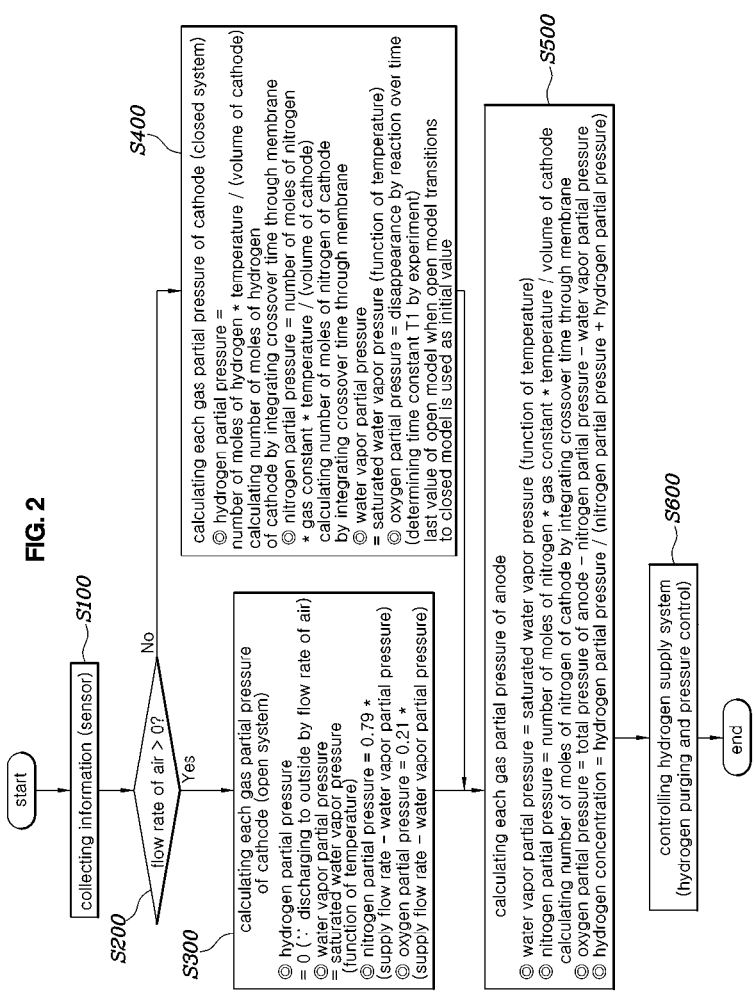
FIG. 2 is a flowchart showing a hydrogen concentration estimating method for a fuel cell according to an embodiment of the present disclosure.

FIG. 2 is a flowchart showing a hydrogen concentration estimating method for a fuel cell according to an embodiment of the present disclosure.

Referring to FIG. 2, a hydrogen concentration estimating method for a fuel cell according to an embodiment of the present disclosure includes: measuring a flow rate of air supplied to a fuel cell stack, and comparing the measured flow rate of air with a predetermined flow rate (S200); determining a model of an air processing system according to a comparison result (S300 and S400); and estimating hydrogen concentration of a fuel processing system based on the determined model of the air processing system (S500).

The flow rate of air supplied to the fuel cell stack may be measured using a sensor (S100). Alternatively, the flow rate of air supplied to the fuel cell stack may be estimated in consideration of rotational speed of an air compressor, an opening ratio of an air control valve (ACV), air pressure, and temperature, etc. However, in this case, the flow rate of air supplied to the fuel cell stack may be determined by using whether the air control valve is shut off in that only whether air is supplied to the fuel cell stack may be used.

The measured flow rate of air may be compared with the predetermined flow rate (S200). Herein, the predetermined flow rate may be set by a flow rate of air that occurs when air supply to the fuel cell stack is shut off. In a case where air supply to the fuel cell stack is shut off due to shut-off of the air control valve, the flow rate of air reaches zero, so that the predetermined flow rate may be set to zero.

Alternatively, although theoretically the predetermined flow rate is zero, in a case where the air control valve is installed only at one of an inlet or an outlet of air, diffusion may occur to some extent and thus the flow rate of air may be greater than zero. Thus, the predetermined flow rate may be set considering a flow rate of air according to diffusion.

In general, when estimating the hydrogen concentration, the fuel processing system is assumed to be closed and the air processing system is assumed to be open. It is reasonable that the air processing system is assumed to be an open model in that external air is introduced and is discharged to outside when air is supplied to the fuel cell.

However, in a fuel cell stop mode, it may be assumed that the air processing system of the fuel cell is closed by being shut off from outside. Specifically, in the fuel cell stop mode, air supply is shut off by an air cut valve. Even when only one of air supply and air discharge is shut off, a diffusion distance is large while a diffusion area is very small and thus diffusion hardly occurs. Thus, in a case where air supply is shut off, it is reasonable that the air processing system is assumed to be a closed model.

Accordingly, in the determining the model of the air processing system (S300 and S400), when the measured flow rate of air exceeds the predetermined flow rate, the air processing system may be determined to be an open model, and when the measured flow rate of air is equal to or less than the predetermined flow rate, the air processing system may be determined to be a closed model. Based on the model of the air processing system determined to be the open or closed model, the hydrogen concentration of the fuel processing system may be estimated.

Specifically, when the air processing system is determined to be an open model (S300), when estimating the hydrogen concentration of the fuel processing system, hydrogen partial pressure of the air processing system is assumed to be zero. This assumes that hydrogen is discharged to outside by the flow rate of air or is consumed by reacting with oxygen contained in the air. Water vapor partial pressure may be assumed to be saturated water vapor pressure that varies as a function of temperature.

Nitrogen partial pressure or oxygen partial pressure of the air processing system may be obtained based on gas pressure and the water vapor partial pressure of the air processing system. Specifically, a value, which is obtained by subtracting the water vapor partial pressure from the gas pressure in the air processing system, may be the sum of the nitrogen partial pressure and the oxygen partial pressure of the air processing system. Assuming that air consists of 79% nitrogen and 21% oxygen, the nitrogen partial pressure may be calculated to be 0.79*(gas pressure of air processing system−water vapor partial pressure) and the oxygen partial pressure may be calculated to be 0.21*(gas pressure of air processing system−water vapor partial pressure).

In determining the model of the air processing system (S200), when the measured flow rate of air is equal to or less than the predetermined flow rate, the air processing system may be determined to be a closed model.

When the air processing system is determined to be a closed model (S400), when estimating the hydrogen concentration of the fuel processing system, it may be assumed that the hydrogen partial pressure of the air processing system is increased by hydrogen that crosses over from the fuel processing system.

Specifically, when estimating the hydrogen concentration (S500), the hydrogen partial pressure of the air processing system may be obtained using the following equations:

$$n_{H_2} = n_{H_2\_init} + \int \dot{n}_{H_2} dt$$

$$P_{H_2} = n_{H_2} \frac{RT}{V_{Ca}}$$

$n_{H_2}$: the number of moles of hydrogen in the air processing system, $n_{H_2\_init}$: the initial number of moles of hydrogen in the air processing system, $\dot{n}_{H_2}$: the number of moles of crossed-over hydrogen per unit time, $P_{H_2}$: the hydrogen partial pressure of the air processing system, R the gas constant, T: the gas temperature. $V_{Ca}$: the volume in the air processing system.

Herein, the initial number of moles of hydrogen ($n_{H_2\_init}$) in the air processing system may be the number of moles of hydrogen in the air processing system that is measured or estimated before integration of the number of moles of crossed-over hydrogen. In a case where there is air flow, assuming that there is no hydrogen in the air processing system, the initial number of moles of hydrogen in the air processing system ($n_{H_2\_init}$) may be assumed to be zero.

When the air processing system is determined to be a closed model (S400), when estimating the hydrogen concentration of the fuel processing system, it may be assumed that the oxygen partial pressure of the air processing system is decreased by oxygen that crosses over to the fuel processing system.

Specifically, when estimating the hydrogen concentration (S500), the oxygen partial pressure of the air processing system may be assumed using the following equation:

$$P_{O_2} = P_{O_2\_init} \exp\left(-\frac{t}{T_1}\right)$$

$P_{O_2}$: the oxygen partial pressure of the air processing system, $P_{O_2\_init}$: the initial oxygen partial pressure of the air processing system, t: the duration time of the closed model of the air processing system, T1: the time constant (constant)

Herein, the initial oxygen partial pressure ($P_{O_2\_init}$) of the air processing system may use the last value calculated in an open model before transition to a closed model. The time constant T1 may be set to be closest to an actual one b experiments. The time constant T1 may have different values depending on the temperature of oxygen.

When the air processing system is determined to be a closed model (S400), when estimating the hydrogen concentration of the fuel processing system (S500), it may be assumed that the nitrogen partial pressure of the air processing system is decreased by nitrogen that crosses over to the fuel processing system.

Specifically, when estimating the hydrogen concentration (S500), the nitrogen partial pressure of the air processing system may be assumed using the following equations:

$$P_{N_2} = n_{N_2} \frac{RT}{V_{Ca}}$$

$$n_{N_2} = n_{Ca} - n_{H_2} - n_{O_2}, \quad n_{Ca} = \frac{P_{Ca} V_{Ca}}{RT}$$

$P_{N_2}$: the nitrogen partial pressure of the air processing system, $n_{N_2}$: the number of mole of nitrogen in the air processing system, $V_{Ca}$: the volume in the air processing system, R: the gas constant, T: the gas temperature, $n_{Ca}$: the number of moles of gas in the air processing system, $n_{H_2}$: the number of moles of hydrogen in the air processing system, $n_{O_2}$: the number of moles of oxygen in the air processing system, $P_{Ca}$: the gas pressure in the air processing system When estimating the hydrogen concentration of the fuel processing system (S500), water vapor partial pressure of the air processing system or the fuel processing system may be assumed to be saturated water vapor pressure that varies as a function of temperature.

The fuel processing system may be assumed to be a closed model (S500). The fuel processing system may be assumed to include only nitrogen, hydrogen, and water vapor. This assumes that when oxygen crosses over through the membrane to the fuel processing system, it reacts with hydrogen and disappears. The water vapor partial pressure may be assumed to be saturated water vapor pressure varies as a function of temperature.

When estimating the hydrogen concentration of the fuel processing system (S500), it may be assumed that the nitrogen partial pressure of the fuel processing system is increased by nitrogen that crosses over from the air processing system. It may be assumed that the hydrogen partial pressure of the fuel processing system is obtained by subtracting the nitrogen partial pressure and the water vapor partial pressure from the gas pressure of the fuel processing system.

Specifically, the nitrogen partial pressure may be assumed by the following equations:

$$P_{N_2} = n_{N_2} \frac{RT}{V_{An}}$$

$$n_{N_2} = n_{N_2\_init} + \int \dot{n}_{N_2} dt$$

$P_{N_2}$: the nitrogen partial pressure of the fuel processing system, $n_{N_2}$: the number of moles of nitrogen in the fuel processing system, $V_{An}$: the volume in the fuel processing system, $n_{N_2\_init}$: the initial number of moles of nitrogen in the fuel processing system, $\dot{n}_{N_2}$: the number of moles of crossed-over nitrogen per unit time Herein, the initial number of moles of nitrogen ($n_{N_2\_init}$) in the fuel processing system may be the number of moles of nitrogen in the fuel processing system that is calculated or measured before integration of the number of moles of crossed-over nitrogen.

It may be assumed that the hydrogen partial pressure is obtained by subtracting the nitrogen partial pressure and the water vapor partial pressure from the gas pressure of the fuel processing system.

When estimating the hydrogen concentration of the fuel processing system (S500), the hydrogen partial pressure of the fuel processing system may be estimated by dividing the hydrogen partial pressure of the fuel processing system by the sum of the nitrogen partial pressure and the hydrogen partial pressure.

Hydrogen concentration=(hydrogen partial pressure/
(nitrogen partial pressure+hydrogen partial pressure)).

After estimating the hydrogen concentration of the fuel processing system (S500), the fuel processing system may be controlled such that the estimated hydrogen concentration of the fuel processing system follows a target hydrogen concentration (S600).

The target hydrogen concentration may be stored by storing in a target hydrogen concentration map in a memory. The target hydrogen concentration map may be obtained by mapping optimum hydrogen concentration according to output current of a fuel cell stack. When the hydrogen concentration is greater than the optimal hydrogen concentration, a crossover amount of hydrogen increases, thus decreasing fuel mileage. When the hydrogen concentration is lower than the optimum hydrogen concentration, durability of the fuel cell stack may be deteriorated due to hydrogen shortage, leading to a decrease in lifespan of the fuel cell stack. The optimum hydrogen concentration may be mapped to a certain region having an upper limit and a lower limit.

A crossover amount of gas may be calculated using a mass transfer equation. Specifically, a purging amount may be taken into consideration when gas crosses over through the membrane or a purge valve is opened.

The mass transfer equation may use a technique known in the art. For example, the crossover amount of gas may be calculated using the following mass transfer equations:

$$n_{N_2\_xo} = \frac{D_{N2}}{RT} \cdot \frac{P_{Ca,N2} - P_{An,N2}}{\delta} \cdot A$$

$$n_{H_2\_xo} = \frac{D_{H2}}{RT} \cdot \frac{P_{An,H2} - P_{Ca,H2}}{\delta} \cdot A$$

Here, the symbols used in the equations are as follows:
$n_{N_2\_xo}$: the nitrogen crossover rate;
$n_{H_2\_xo}$: the hydrogen crossover rate;
P: the pressure, [kPa];
R: the gas constant, 8.314 [J/mol/K];
T: the temperature, [K];
D: the diffusion coefficient;
A: the catalyst area; and
δ: the diffusion distance.

Based on the estimated hydrogen concentration of the fuel processing system, fuel processing system may be controlled such that the hydrogen concentration in the fuel processing system follows the target hydrogen concentration. Closed loop control such as PI control may be used to guarantee robustness with respect to disturbance such as sudden start or a fuel cell stop mode.

Specifically, when the estimated hydrogen concentration is less than the target hydrogen concentration, the hydrogen concentration may be controlled to be increased. The purge valve may be controlled to be open to thereby increase the hydrogen concentration by purging, or a fuel supply valve and a fuel ejector may be controlled to pressurize hydrogen to be supplied from a fuel storage system to the fuel processing system.

Figure 3:
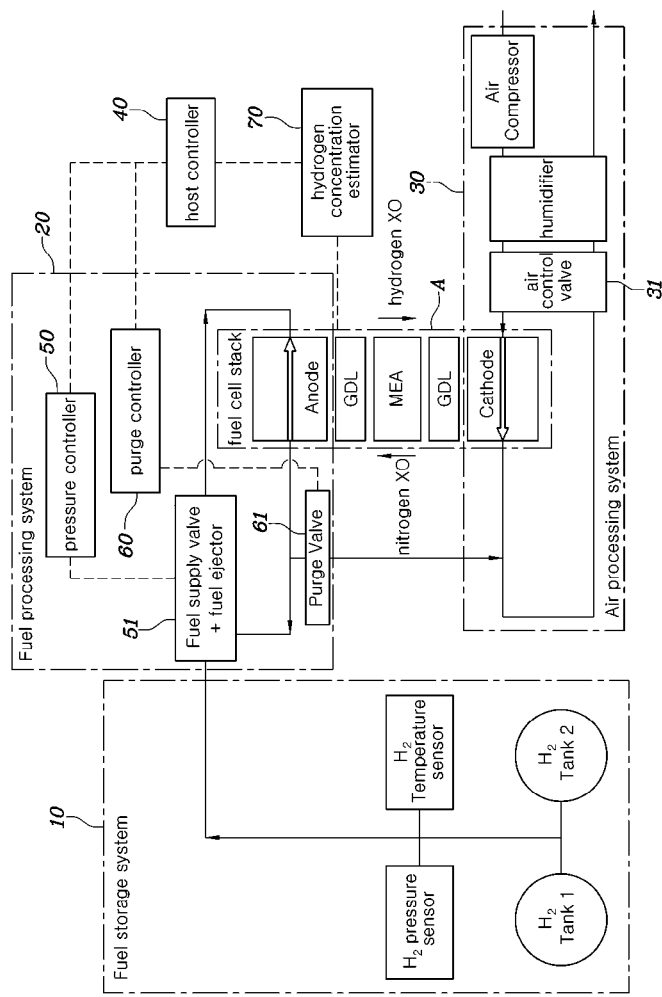
FIG. 3 is a configuration diagram showing a hydrogen concentration estimating system for the fuel cell according to the embodiment of the present disclosure.

FIG. 3 is a configuration diagram showing a hydrogen concentration estimating system for the fuel cell according to the embodiment of the present disclosure.

Referring to FIG. 3, a hydrogen concentration estimating system for a fuel cell according to an embodiment of the present disclosure includes: an air processing system 30 for supplying air to a fuel cell stack A; a fuel processing system 20 for supplying hydrogen to the fuel cell stack A; and a hydrogen concentration estimator 70 for measuring a flow rate of air supplied to the fuel cell stack A from the air processing system 30, comparing the measured air flow rate with a predetermined flow rate, determining a model of the air processing system 30, and estimating hydrogen concentration of the fuel processing system 20 based on the determined model of the air processing system 30.

The flow rate of air may be controlled by an opening ratio of an air control valve 31 provided in an air supply or discharge line of the air processing system 30. The flow rate of air may be estimated by measuring the opening ratio of the air control valve 31.

The hydrogen concentration estimator 70 may determine the air processing system 30 to be an open model when the measured flow rate of air exceeds the predetermined flow rate, and may determine the air processing system 30 to be a closed model when the measured flow rate of air is equal to or less than the predetermined flow rate.

The hydrogen concentration estimating system may further include: a pressure controller 50 for controlling pressure of hydrogen supplied from the fuel storage system 10 to the fuel processing system 20; a purge controller 60 for controlling opening and closing of a purge valve 61; and a host controller 40 for controlling the pressure controller 50 and the purge controller 60 such that the hydrogen concentration of the fuel processing system 20 estimated by the hydrogen concentration estimator 70 follows a target hydrogen concentration.

The pressure controller 50 controls pressure of hydrogen supplied from the fuel storage system 10 to the fuel processing system 20 by controlling a fuel supply valve 51 and a fuel ejector 51.

The host controller 40, the pressure controller 50, the purge controller 60, and the hydrogen concentration estimator 70 may be all included in a fuel-cell control unit (FCU) or may be provided as individual controllers.

Figure 4:
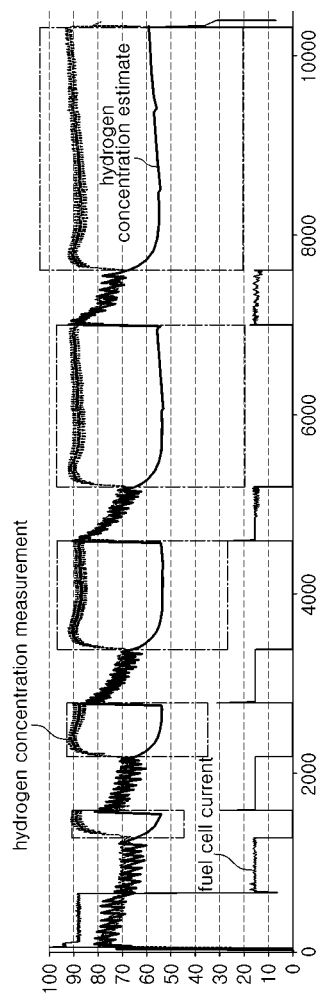
FIG. 4 is a graph showing a hydrogen concentration measurement and a hydrogen concentration estimate as a function of fuel cell current according to the hydrogen concentration estimating method for the fuel cell according to the embodiment of the present disclosure.

FIG. 4 is a graph showing a hydrogen concentration measurement and a hydrogen concentration estimate as a function of fuel cell current according to the hydrogen concentration estimating method for the fuel cell according to the embodiment of the present disclosure.

Referring to FIG. 4, the hydrogen concentration estimate according to the hydrogen concentration estimating method according to the present disclosure closely corresponds to the hydrogen concentration measurement particularly in a fuel cell power generation section. In addition, a section where fuel cell current is zero is unreliable in that the hydrogen concentration measurement is rather increased in a FC STOP section where fuel cell power generation stop is controlled. However, the hydrogen concentration estimate is maintained at a hydrogen concentration of equal to or greater than 50%. Moreover, it can be seen that the hydrogen concentration estimate converges to the hydrogen concentration measurement soon after the FC STOP section is released.

Thus, according to the hydrogen concentration estimating method for the fuel cell according to the embodiment of the present disclosure, it can be confirmed that accuracy of hydrogen concentration estimation is improved.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A hydrogen concentration estimating method for a fuel cell, the method comprising:
   measuring a flow rate of air supplied to a fuel cell stack, and comparing the measured flow rate of the air with a predetermined flow rate;
   determining the air processing system to be an open model when the measured flow rate of air exceeds the predetermined flow rate;
   determining the air processing system to be a closed model when the measured flow rate of the air is equal to or less than the predetermined flow rate; and
   estimating hydrogen concentration of a fuel processing system based on the determined model of the air processing system.

2. The method of claim 1, wherein in comparing the measured flow rate of the air with the predetermined flow rate, the predetermined flow rate is set by a flow rate of air that occurs when air supply to the fuel cell stack is shut off.

3. The method of claim 1, wherein when the air processing system is determined to be the open model, when estimating the hydrogen concentration of the fuel processing system, hydrogen partial pressure of the air processing system is zero.

4. The method of claim 1, wherein when the air processing system is determined to be the open model, when estimating the hydrogen concentration of the fuel processing system, nitrogen partial pressure or oxygen partial pressure of the air processing system is based on gas pressure and water vapor partial pressure of the air processing system.

5. The method of claim 1, wherein when the air processing system is determined to be the closed model, when estimating the hydrogen concentration of the fuel processing system, hydrogen partial pressure of the air processing system is increased by hydrogen that crosses over from the fuel processing system.

6. The method of claim 5, wherein when estimating the hydrogen concentration, the hydrogen partial pressure of the air processing system is obtained using the following equations:

$$n_{H_2} = n_{H_2\_init} + \int \dot{n}_{H_2} dt$$

$$P_{H_2} = n_{H_2} \frac{RT}{V_{Ca}}$$

$n_{H_2}$: the number of moles of hydrogen in the air processing system, $n_{H_2\_init}$: the initial number of moles of hydrogen in the air processing system, $\dot{n}_{H_2}$: the number of moles of crossed-over hydrogen per unit time, $P_{H_2}$: the hydrogen partial pressure of the air processing system, R: gas constant, T: gas temperature, $V_{Ca}$: volume in the air processing system.

7. The method of claim 1, wherein when the air processing system is determined to be the closed model, while estimating the hydrogen concentration of the fuel processing system, oxygen partial pressure of the air processing system is decreased by oxygen that crosses over to the fuel processing system.

8. The method of claim 7, wherein when estimating the hydrogen concentration, the oxygen partial pressure of the air processing system is obtained using the following equation:

$$P_{O_2} = P_{O_2\_init} \exp\left(-\frac{t}{T_1}\right)$$

$P_{O_2}$: the oxygen partial pressure of the air processing system, $P_{O_2\_init}$: initial oxygen partial pressure of the air processing system, t: duration time of the closed model of the air processing system, T1: time constant (constant).

9. The method of claim 1, wherein when the air processing system is determined to be the closed model, when estimating the hydrogen concentration of the fuel processing system, nitrogen partial pressure of the air processing system is decreased by nitrogen that crosses over to the fuel processing system.

10. The method of claim 7, wherein when estimating the hydrogen concentration, the nitrogen partial pressure of the air processing system is obtained using the following equations:

$$P_{N_2} = n_{N_2} \frac{RT}{V_{Ca}}$$

$$n_{N_2} = n_{Ca} - n_{H_2} - n_{O_2}, \quad n_{Ca} = \frac{P_{Ca} V_{Ca}}{RT}$$

$P_{N_2}$: the nitrogen partial pressure of the air processing system, $n_{N_2}$: the number of mole of nitrogen in the air processing system, $V_{Ca}$: volume in the air processing system, R: gas constant, T: gas temperature, $n_{Ca}$: the number of moles of gas in the air processing system, $n_{H_2}$: the number of moles of hydrogen in the air processing system, $n_{O_2}$: the number of moles of oxygen in the air processing system, $P_{Ca}$: gas pressure in the air processing system.

11. The method of claim 1, wherein when estimating the hydrogen concentration of the fuel processing system, water vapor partial pressure of the air processing system or the fuel processing system is saturated water vapor pressure.

12. The method of claim 1, wherein when estimating the hydrogen concentration of the fuel processing system, nitrogen partial pressure of the fuel processing system is increased by nitrogen that crosses over from the air processing system.

13. The method of claim 1, wherein when estimating the hydrogen concentration of the fuel processing system, hydrogen partial pressure of the fuel processing system is obtained by subtracting nitrogen partial pressure and water vapor partial pressure from gas pressure of the fuel processing system.

14. The method of claim 1, wherein when estimating the hydrogen concentration of the fuel processing system, hydrogen partial pressure of the fuel processing system is estimated by dividing hydrogen partial pressure of the fuel processing system by the sum of nitrogen partial pressure and the hydrogen partial pressure.

15. The method of claim 1, wherein after estimating the hydrogen concentration of the fuel processing system, the fuel processing system is controlled such that the estimated hydrogen concentration of the fuel processing system follows a target hydrogen concentration.

16. A hydrogen concentration estimating system for a fuel cell, the system comprising:
   an air processing system supplying air to a fuel cell stack;
   a fuel processing system supplying hydrogen to the fuel cell stack; and
   a hydrogen concentration estimator measuring a flow rate of the air supplied to the fuel cell stack from the air processing system, comparing the measured flow rate of the air with a predetermined flow rate, determining the air processing system to be an open model when the measured flow rate of air exceeds the predetermined flow rate, determining the air processing system to be a closed model when the measured flow rate of the air is equal to or less than the predetermined flow rate, and estimating hydrogen concentration of the fuel processing system based on the determined model of the air processing system.

17. The system of claim 16, further comprising:
   a pressure controller controlling pressure of the hydrogen supplied from the fuel storage system to the fuel processing system;
   a purge controller controlling opening and closing of a purge valve; and
   a host controller controlling the pressure controller and the purge controller such that the hydrogen concentration of the fuel processing system estimated by the hydrogen concentration estimator follows a target hydrogen concentration.

* * * * *